United States Patent [19]
Hirata

[11] Patent Number: 5,267,313
[45] Date of Patent: Nov. 30, 1993

[54] FILE SECURITY SYSTEM
[75] Inventor: Kozo Hirata, Yokohama, Japan
[73] Assignee: Laurel Intelligent Systems, Co., Ltd., Yokohama, Japan
[21] Appl. No.: 914,722
[22] Filed: Jul. 20, 1992
[30] Foreign Application Priority Data Sep. 26, 1991 [JP] Japan .................. 3-273501

[51] Int. Cl.$^5$ ............................................. H04K 1/00
[52] U.S. Cl. ...................................... 380/21; 380/25
[58] Field of Search ................... 380/21, 25, 45, 49

[56] References Cited
U.S. PATENT DOCUMENTS

| | | | |
|---|---|---|---|
| 4,731,840 | 3/1988 | Mniszewski et al. | 380/21 |
| 4,853,962 | 8/1989 | Brockman | 380/21 |
| 5,058,162 | 10/1991 | Santon et al. | 380/25 |
| 5,081,678 | 1/1992 | Kaufman et al. | 380/21 |

FOREIGN PATENT DOCUMENTS 3-68582 10/1991 Japan .

Primary Examiner—Salvatore Gangialosi
Attorney, Agent, or Firm—Varndell Legal Group

[57] ABSTRACT

A file security system of such a constitution that after plaintext has been enciphered by data encryption key means the encryption key means per se is stored or made freely transmissible in the state further enciphered by the encryption key maintained in secret and the information thus processed can be deciphered into plaintext information only by making good use of said encryption key means.

6 Claims, 3 Drawing Sheets

FILE SECURITY SYSTEM

BACKGROUND OF THE INVENTION

1. Field of the Invention

The present invention relates to a file security system in which it has been made possible that enciphered data are stored in a storage medium and said data are deciphered only by the deciphering means specifically kept secret.

2. Prior Art

Heretofore, in order to prevent information from being disguised or disclosed, the technique of keeping enciphered information in custody has been widely put to practical use not only for military but also for civilian purposes, and as an algorithm for the enciphering, for instance, Data Encryption Standard (DES) was published in the United State of America in 1977.

Accordingly, in the case where a writing (plaintext) which one can read and understand is to be enciphered as occasion demands, it has been devised in such a way that the plaintext is enciphered and written in an auxiliary storage means by driving the encryption unit through the user's application program by utilizing, for instance, the above-described Data Encryption Standard, and then the "key" composed of one kind of random number used in the above-described algorithm is utilized to achieve the deciphering. Thus, as the user, only the information whose enciphering desired could be enciphered and deciphered.

Further, as one of the commercialized techniques of information transfer according to such DES there is known, for instance, the Bank of Japan Finance Network System.

The characteristic points in the above-described system are found in that in the case of data transmission, in order to prevent the surreptitious reading, disguise, or unjust input of the information the system is designed to encipher the information according to the above-described DES, and also in the case of data output, it is designed to prevent disguise of the information by making full use of the Message Authentication Code (MAC) which is unique character produced by enciphering techniques, thus ensuring the safety of information transmission as well as the proof of transaction.

Further, in the Credit and Finance Information System it is contemplated that the privacy of the user's information is strictly kept in such a way that by utilizing the terminal equipment the user's account number of sales telegram is enciphered and this information is communicated from the bank to the center of the above-described Credit and Finance Information System.

In the above-described techniques of keeping information secret, there have still remained the following problems to be solved.

In the first place, since the algorithm of the above-described Data Encryption Standard has now been prevailingly known, the users are taking pains to keep the above-described particular "key" secret for the maintenance of the privacy of information.

In the next place, with regard to, for instance, "the account number" or "the information retrievable by name" in the banking business the portion corresponding to the retrieving key cannot be enciphered as a matter of course, so that it is not possible in actuality to contemplate the enciphering of the whole information, rendering it inevitable to use the application program by particular programming.

Furthermore, in the case where as the storage medium for the information storage and transmission, use is made of the magneto-optical disk MOD which may also be called a floppy disk of an especially large capacity, it is convenient in that transportation is easy on account of its compactness, whereas there remain possibilities such that it can be readily carried away, misdelivered, and so on, and therefore, in the security management of information an original idea or a new device is found to be indispensable.

SUMMARY OF THE INVENTION

The present invention provides a system which can solve the problems unsolved in the above-described prior art, that is, a file security system characterized in that as the means it comprises the first enciphering means which enciphers the plain-text information provided by the use of a data encryption key and the second enciphering means which is provided with an encryption key capable of enciphering said data encryption key, and while designing the system in such a way that the information enciphered by the above-described encryption key is stored in a magneto-optical floppy and this information is deciphered only by the above-described encryption key, it is further provided with the data processing means which enables operations of exclusive OP and substitution as well as chain means between the codes.

DETAILED DESCRIPTION AND THE PREFERRED EMBODIMENT

Figure 1:
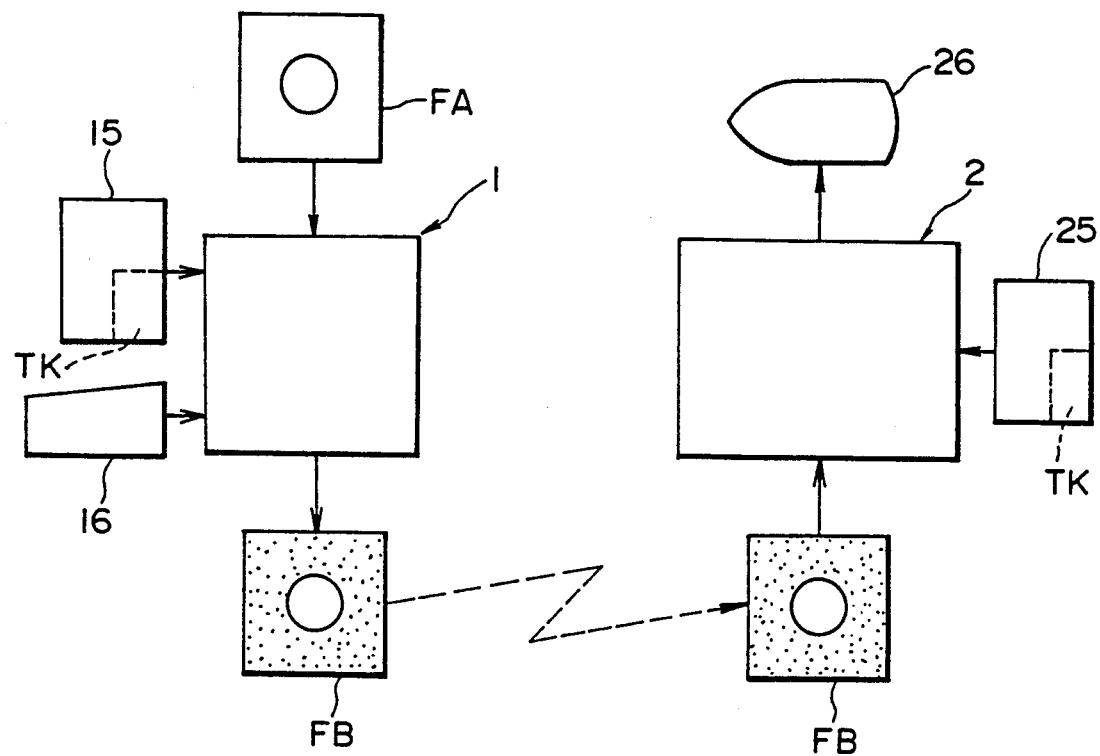
FIG. 1 shows the whole aspect of the constitution of the system of the present invention.

In the present invention, in accordance with the above-described means for solving problems, the plaintext information requiring to be kept secret is preliminarily enciphered by the data encryption key means, and further, this data encryption key means per se is enciphered by the encryption key which is in a secret state acting as the master key and after having been stored or made freely transmissible, this information can be deciphered into the plaintext information only by utilizing said deciphering key means, so that it is contemplated that without being restricted by the application program held by the user the plaintext is enciphered in the stage of the final writing and deciphered in the stage of reading, and moreover, since in the enciphering and deciphering the use of the specific key is an indispensable condition, even in the information transmission system utilizing the magneto-optical floppy MOD, the privacy of the information can be safely ensured.

As explained with reference to an embodiment below, in the present invention, it is possible that valuable secret information is enciphered by data encryption key, and further this data encryption key can be recorded and transmitted in such a state that it is enciphered by the encryption key means which acts as the master key maintained in complete secret within a black box, so that only the person who keeps the encryption key having the master function can rightly write, rewrite and read out the information, and since, under the situation of mere enciphering operation the data encryption key remains unknown, the present invention can produce remarkable effects in that information can be completely prevented from leakage and disguise.

Also, since the operation of exclusive OR and substitution as well as the chain means between the codes were adopted in the enciphering process, the processing time could be shortened by a large margin, enabling high speed processing.

Next, with reference to the drawing showing an embodiment the present invention will be explained below in detail.

In the first place, by FIG. 1 the general outline of the system may be explained as follows.

Figure 2:
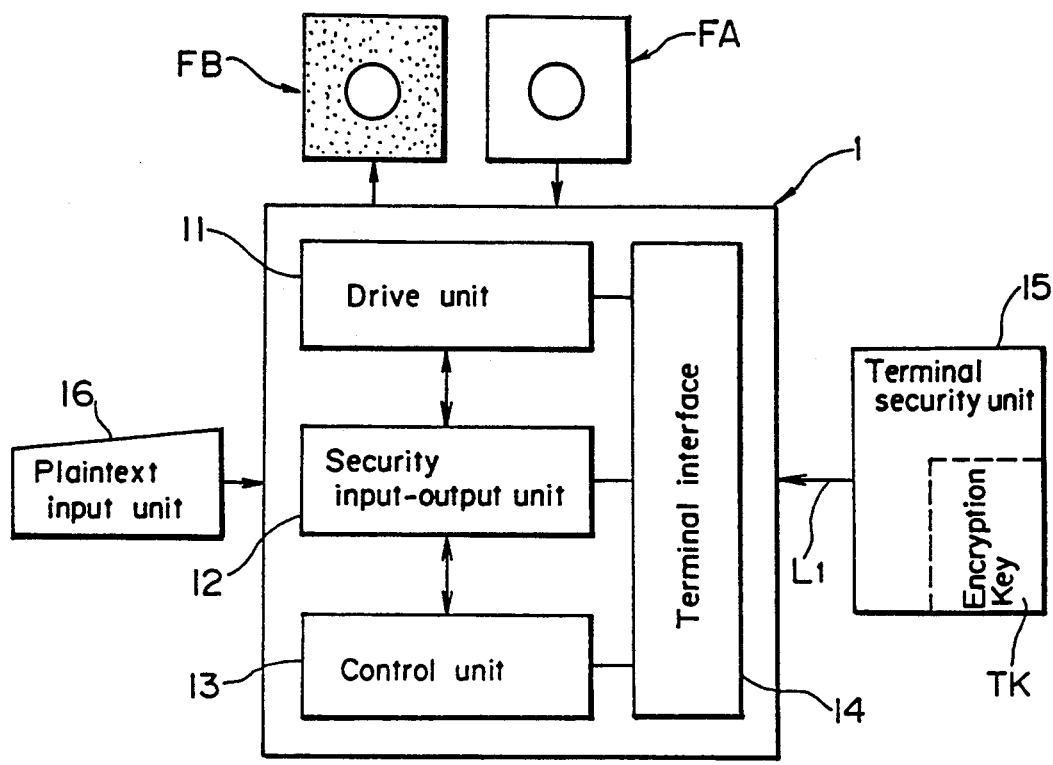
FIG. 2 is a block diagram showing the enciphering means in FIG. 1.
Figure 3:
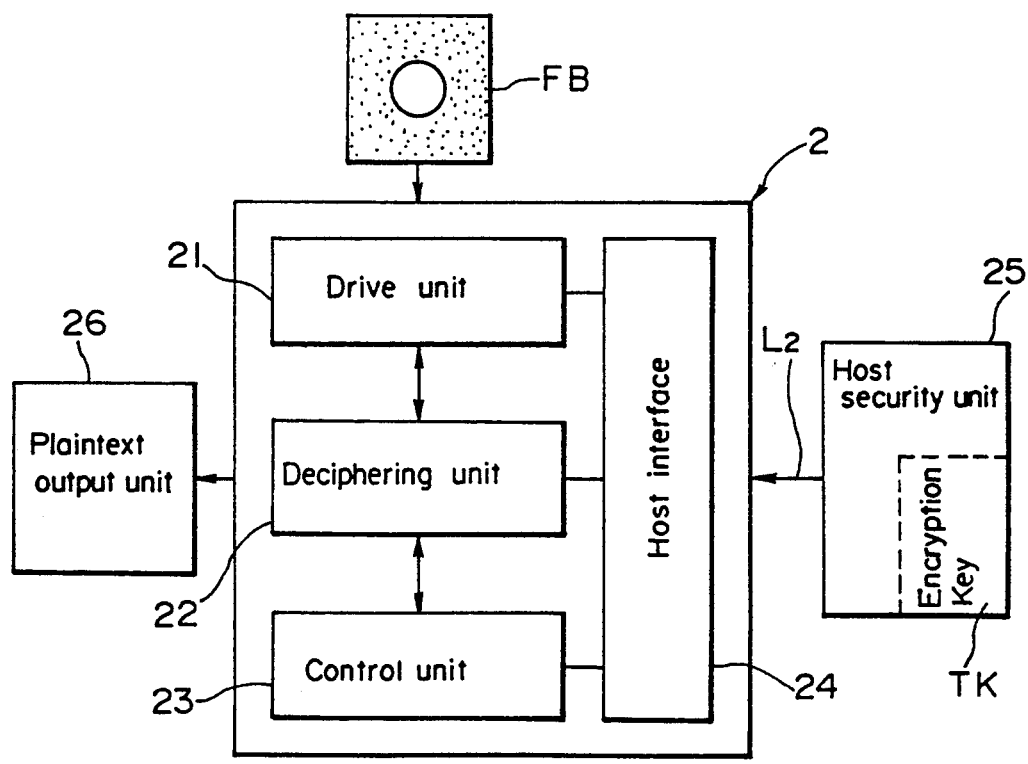
FIG. 3 is a block diagram showing the deciphering means in FIG. 1.

That is to say, the system is the one designed in such a way that the plaintext information (X) provided by the terminal device 1 installed at the home-banking in the home or at the branch offices, or the like, of financial institutions such as banks, etc. is enciphered and stored in an empty floppy FA that is magneto-optical disk of a large capacity, and said floppy is deciphered and read out into the plaintext information (X) in the host device 2 which is in the mutually independent relation with each of the terminal devices. With reference to FIGS. 2 and 3 too, the function of the system will be explained in more detail below.

The terminal device 1 which the user utilizes for the enciphering process is in connection with, for instance, a personal computer as an operation instruction as well as plain text input unit 16, and within the interior thereof there are provided a drive unit 11 which can receive the empty floppy FA and drive it, a security input-output unit 12 which can encipher the plain-text information (X), and a control unit 13 which can freely control a terminal security unit 15. Each of these units 11-13 can be connected with the above-described terminal security unit 15 by line $L_1$ through the terminal interface 14 for high speed communication use, but as the connection means it should preferably be in the form of connection widely usable for various purposes such as, for instance, RS 232C, SCSI, etc.

Further, the above-described terminal security unit 15 which functions as one kind of enciphering device is of the type of a black box, wherein there is enclosed a personal encryption key TK about which only the user knows that it has been designed in such a way that when the enclosure is opened, for instance, by an illegal reverse-engineering, or the like, the content is automatically extinguished. The encryption key per se has no function of directly enciphering the plaintext information (X), but instead fulfills the function of one kind of master key, i.e., it enciphers the data encryption key DEX, or, so to speak, it possesses the function which can further encipher the "key" on the algorithm enciphering the plaintext information (X).

On the other hand, as shown in FIG. 3, as the hardware for the deciphering process there is provided the host device 2 installed at the main office, or the like, of financial institutions, and within the interior thereof there are provided a drive unit 21 which can drive the floppy having the enciphered information stored, a deciphering unit 22, and a control unit 23 which controls the host security unit 25. These units 21-23 are also in connection with the above-described host security unit 25 through the host interface 24 for the high speed communication use, whereby the form of connection is due to the line $L_2$ such as a connector widely used for various purposes (RS 232C) or SCSI as in the case of the terminal device 1.

Also with regard to the host security unit 25, it is, as in the case of the terminal security unit 15, of the type of a black box, wherein an encryption key TK the same as the above-described is housed for the deciphering into the plaintext information.

Further, as for the algorithm adopted in this system, in order to attempt the speed up of the processing a specific algorithm (LDES) is adopted with a background of the above-described standard DES.

That is to say, the main content of this specific algorithm (LDES) is in brief of the form such that it is intended to encipher every one single character (1 code) by making good use of the operations of exclusive OR (XOR) and substitution as well as the chain between the codes that are readily processed by the user's application program for the above-described security input-output unit 12. In accordance with this form even by means of the terminal equipment such as the standard general-use type personal computer, etc. high speed processing can be made within about 7 $\mu$s/code, and for instance, the time required for plaintext of 1024 bytes to be enciphered is in the order of about 15 ms. which remains within the limits of the tolerance of the user's program.

Figure 4:
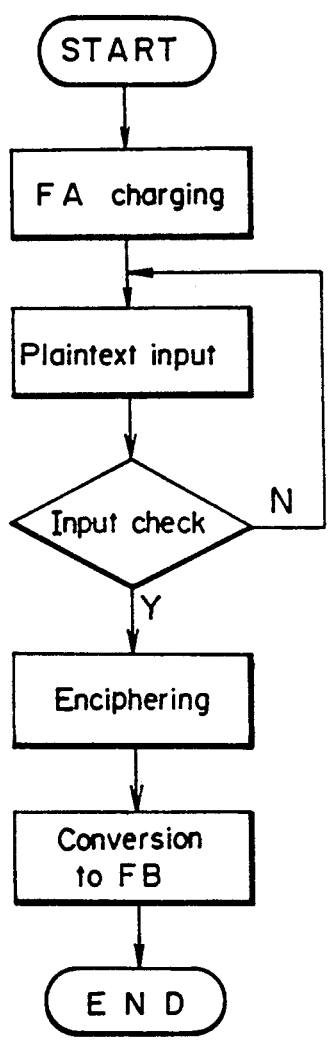
FIG. 4 is a flow chart showing the steps of procedure in the enciphering process.
Figure 5:
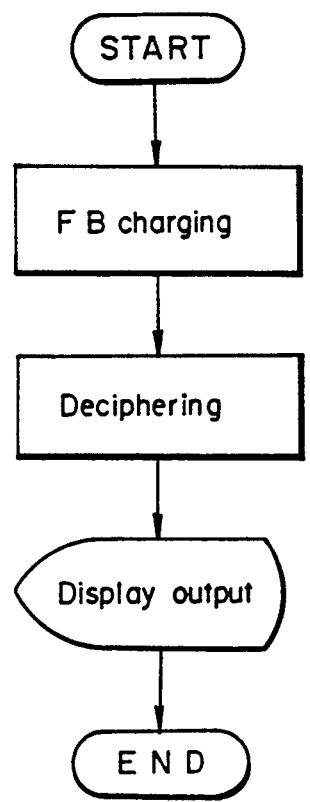
FIG. 5 is a flow chart showing the steps of procedure in the deciphering process.

Next, with reference to FIGS. 4 and 5, the respective steps of enciphering and deciphering will be explained.

(1) Step of Enciphering

In the first place, in the case where plaintext information (X) is enciphered, an empty floppy FA that is a storage medium of a large capacity is beforehand provided for storing the information, and by application means not shown in the figure, security ID is written in this empty floppy FA, in which case, however, if the security ID is set to be, for instance, $E_{TK(OEK)}$, then the $E_{TK(OEK)}$ has to input to said empty floppy FA as the security ID, so that the empty floppy FA in that state is charged in the drive unit 11 of the terminal device 1 and input to the plaintext information (X) security input-output unit 12 by the plaintext input unit 16 of a personal computer, or the like, that is the general-use plaintext input means.

In this security input-output unit 12, the control unit 13 is started in accordance with the application program provided therein, and through the interspatially provided terminal interface 14 the above-described security ID is transferred to the terminal security unit 15 to receive the data encryption key DEX, which is used therein for the intended enciphering, whereby the writing on the empty floppy is carried out as follows.

That is to say, in accordance with the program in the security input-output unit 12 the plaintext information (X) is enciphered by the data encryption key on the user side to give a cipher in the equation: $E_{TK(DEX)}$ (1), and then, the data encryption key DEX is further enciphered by the above-described encryption key TK in the terminal security unit to convert it as shown by the equation: EDEK(X) (2), and write it in the empty floppy FA in that form.

Thus, the information enciphered in the desired form in the empty floppy FA is stored in the form of the above-described equation (2) to give a cipher-stored floppy FB.

In addition, as a matter of course the data encryption key DEX as well as the encryption key TK is fully known to the user side, so that it is also needless to say that the system is constituted in such a manner that the plaintext information (X) can be checked for the confirmation of its accuracy by making good use of the CRT, etc. of the personal computer acting as the plaintext information input unit 16.

As described above, in the present example, the user gives instructions of writing and storing to the security input-output unit 12 by the program which he uses, with the intention of enciphering the information by the above-described processing, so that the data encryption key DEX on the user side may not be mentioned to be sufficient in the point of maintenance of secrecy, but as it is contemplated that the data encryption key DEX is enciphered by the encryption key TK possessed of the character as the master key stored within the black box, there is not a shred of uneasiness in keeping the whole system secret, and if unfortunately a leakage of the data encryption key DEX should occur, the safety of the present security system as a whole cannot be threatened in the least.

(2) Step of Deciphering

Next, as to the deciphering, it is operated in such a way that the above-described cipher-stored floppy FB is charged in the drive unit 21 of the host device 2 so as to start the host device 2 by a personal computer, or the like, which acts as a plaintext output unit 26, whereby the control unit 23 is driven by the application program within the deciphering unit 22, so that the encryption key TK similar to the above-described one in the host security unit 25 is received by the deciphering unit 23 through the host interface 24, and then, the enciphered information of the above-described equation (2) is deciphered by the same operation as in the case of the enciphering and converted into plaintext information (X), whose content may be visualized by means of, for instance, the CRT of the personal computer, or the like, which acts as the plaintext output unit 26.

In addition, in the present example, explanation was given chiefly on the system wherein the magneto-optical floppy was adopted as the storage medium of a large capacity, but it is needless to say that even by the ordinary floppy disk, or other optical disks, or DAT, etc. the same file security system can be constituted, these being included in the other examples of the present invention.

What is claimed is:

1. A file security system which comprises a terminal device and a host device;
   said terminal device including:
   a removable terminal key means including means for storing a personal encryption key, and destroying said personal encryption key when said terminal key means is opened,
   first means for inputting plaintext information and writing corresponding enciphered information and an enciphered data encryption key on a storage device,
   security input-output means for enciphering said plaintext information by using the data encryption key and for enciphering said data encryption key by using a personal encryption key,
   terminal control means for controlling said first means and said security input-output means, and for outputting said personal encryption key to said terminal key, and
   terminal interface means for connecting said first means, said security input-output means, said terminal control means and said terminal key;
   said host device including:
   a host key means including means for storing said personal encryption key,
   second means for reading said corresponding enciphered information from said storage device and writing said plaintext information,
   deciphering means for deciphering said enciphered data encryption key using said personal encryption key and deciphering said corresponding enciphered information using said deciphered data encryption key,
   host control means for controlling said second means and said deciphering means, and for retrieving said personal encryption key, and
   host interface means for connecting said second means, said deciphering means, said host control means and said host key;
   wherein said terminal and host keys means contain said means for respectively connecting to said terminal and host interface means.

2. The file security system of claim 1, wherein said terminal and host keys are in the form of a box.

3. The file security system of claim 1, wherein said storage device of said first means includes a magneto-optical floppy for storing said enciphered information and said enciphered data encryption key.

4. The file security system of claim 1, wherein said terminal control means and said host control means include data processing means which enables operations of exclusive OR, substitution, and chaining between codes.

5. The file security system of claim 1, wherein said host key is removable from said host device in normal operation.

6. The file security system of claim 2, wherein said host key is removable from said host device in normal operation.

* * * * *